United States Patent [19]

Ewing

[11] 4,168,572
[45] Sep. 25, 1979

[54] APPARATUS FOR CUTTING VEGETATION

[75] Inventor: Lenord G. Ewing, Houston, Tex.

[73] Assignee: Weed Eater, Inc., Houston, Tex.

[21] Appl. No.: 814,516

[22] Filed: Jul. 11, 1977

[51] Int. Cl.² ............... A01G 3/06; A01D 35/26
[52] U.S. Cl. .................................. 30/276; 56/12.7
[58] Field of Search ............... 30/276, 347; 56/12.7, 56/295; 51/335

[56] References Cited
U.S. PATENT DOCUMENTS

| 2,854,798 | 10/1958 | De Haven | 51/335 |
| 4,047,299 | 9/1977 | Bair | 30/347 |

FOREIGN PATENT DOCUMENTS 852150 7/1977 Belgium ..................... 30/276

*Primary Examiner*—Jimmy C. Peters

[57] ABSTRACT

An apparatus for cutting vegetation with a rotating head carrying a flexible, non-metallic cutting line wound on a rotatable spool with its free end extended radially into a cutting plane. An additional length of line is extended into the cutting plane by pushing the head against the ground to move inwardly a glide ball. The ball by a spiral ratchet rotates the spool in a predetermined angular displacement in the head. After the cutting line length is extended, the spool is secured automatically against further rotation within the head. Lengths of cutting line can be extended with the head rotating or stationary.

9 Claims, 8 Drawing Figures

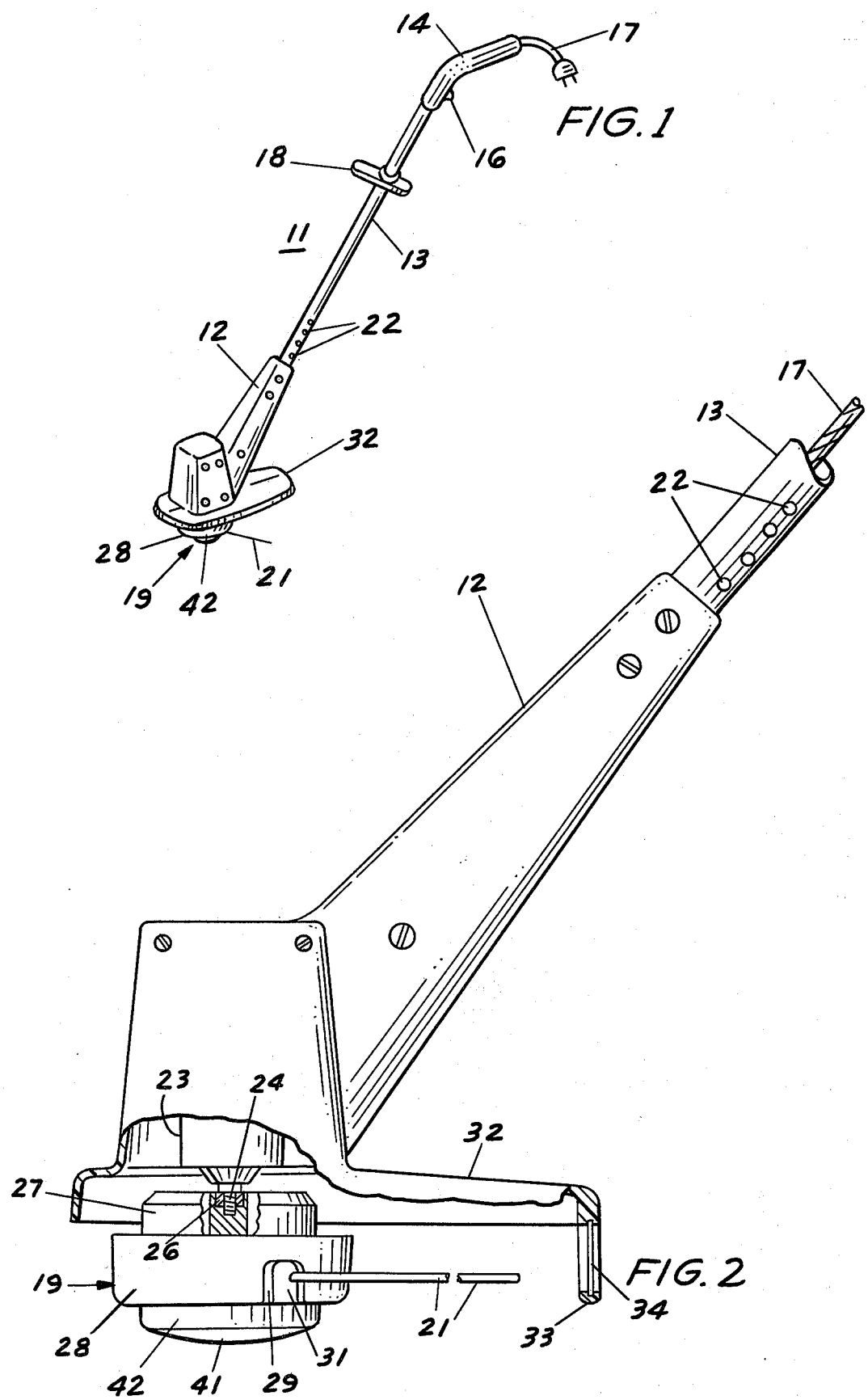

4,168,572

APPARATUS FOR CUTTING VEGETATION

BACKGROUND OF THE INVENTION

1. Field of the Invention

This invention relates to the cutting of vegetation, and more particularly, it relates to the cutting of vegetation using a flexible, non-metallic cutting line extending from a rotating head into a cutting plane.

2. Description of the Prior Art

Various types of devices have been proposed for many years to facilitate the removal of vegetation by mowing, trimming, edging and like operations. In general, these devices have employed a metal blade to effect vegetation removal. Devices of this nature employ prime movers such as electric and gasoline motors. As a result, rotating metal blades can inflict serious and terrible injury upon the user.

In about 1960, there was developed in Europe a trimmer-edger unit employing a flexible polymeric line extending from a rotating head for cutting vegetation. This unit did not work properly because of several defects in structure and operating parameters. In the United States of America, practical vegetation cutting devices using flexible, non-metallic lines carried upon a rotating head were developed. The devices are shown in U.S. Pat. Nos. 3,708,967, 3,826,068, and 3,859,776. These patented devices have met outstanding success in the worldwide marketplace. One reason for this success is that these American developments are probably the safest electrical or gasoline-powered tools yet invented for vegetation cutting, edging and trimming operations.

The devices shown in these patents employ a flexible cutting line, such as manufactured from Nylon ® polymer. The cutting line is carried upon a spool internally of a rotating head. When desired to replenish the line or to extend an additional length of it, the rotation of the head was stopped and line manually extended from the head by either (1) uncoiling directly from the head; or (2) unlocking an internal spool, pulling the line from the head to the desired length and relocking the spool against rotation in the head. These structures in the patented devices have been found to be convenient, simple and reliable. In many of the smaller devices, especially those powered by electric motors, a simpler system to extend the cutting line from the head was desired. The present invention is a device for cutting vegetation in the nature of the patented devices, wherein a simple but reliable mechanism is employed for extending selectively the cutting line in a certain length from the head. More particularly, this novel device or apparatus is simple to operate and has no complicated mechanisms.

The head of the apparatus is merely pressed against the ground to move an actuating member. This member, by direct mechanical connection, moves an additional length of cutting line from the head into the cutting plane. Then, the cutting line is secured against unintended extension. Lengths of cutting line can be extended from the head whether it is stationary or being rotated with equal facility. Other features of the present invention will be apparent from the following description.

SUMMARY OF THE INVENTION

In accordance with this invention, there is provided an apparatus for cutting vegetation which has a head rotatable about an axis of rotation and a drive connection extending from a first face. A second face on the head is adapted to travel over vegetation-covered earth's surface. A supply of a flexible, non-metallic cutting line is carried on the head and has a free end extending outwardly of the head into a cutting plane. An actuating member projects from the second surface and is mounted for manually-induced movement from a first station to a second station when the head is pressed firmly against the surface (e.g. the ground). Feeder means on the head are adapted to extend the cutting line from the head into the cutting plane. Connecting means between the actuating member and the feeder means extend a certain length of cutting line into the cutting plane and then secure the line against unintended extension. Lengths of cutting line can be extended with the head stationary or rotating.

DESCRIPTION OF THE DRAWINGS

FIG. 1 is a pictorial view illustrating one embodiment of the apparatus for cutting vegetation arranged according to the present invention;

FIG. 2 illustrates in enlargement the lower portion of the apparatus shown in FIG. 1;

DESCRIPTION OF SPECIFIC EMBODIMENTS

Figure 3:
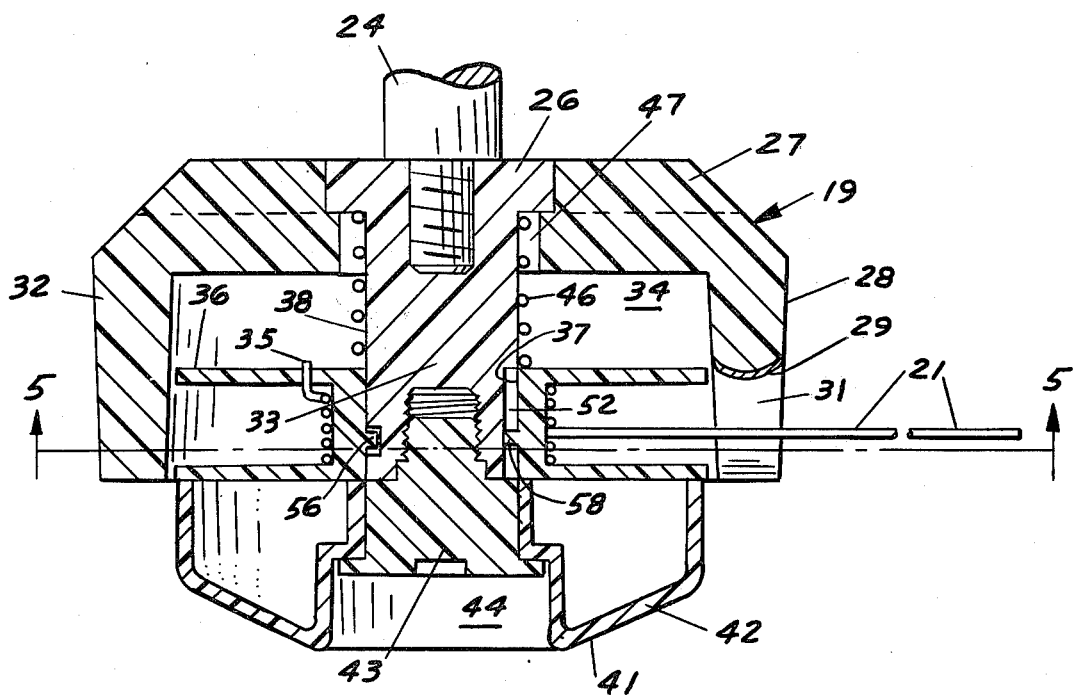
FIG. 3 is a vertical section, in enlargement, taken through the head of the apparatus shown in FIG. 2.

Referring to FIG. 1, there is shown an apparatus for cutting vegetation, which is constructed in accordance with one embodiment of the present invention. In this particular embodiment, the apparatus is a grass trimmer 11, but it could be a lawnmower, edger, or other device for vegetation cutting purposes. The trimmer 11 has a lower housing 12 interconnected by a tube 13 to handle assembly 14. The assembly 14 provides a switch 16 for selectively applying electrical power received by a cord 17 to an electrical motor carried within the housing. For two-handed operation of the trimmer 11, an auxiliary handle 18 is provided upon the tube 13. The lower housing 12 carries a rotatable head 19 from which extends at least one length of a flexible, non-metallic cutting line 21. Rotation of the head 19 about an axis passing through the housing 12 extends the cutting line 21 into a cutting plane which is substantially perpendicular to the axis of rotation of the head.

In FIG. 2, there is shown an enlargement of the housing 12 with a portion of the tubing 13 carrying a plurality of air induction openings 22. These openings introduce a flow of cooling air over the prime mover contained in the housing 12. In the particular embodiment being described, the housing 12 includes an electrical motor 23 which has a downwardly extending drive shaft 24. The head 19 is threadedly connected to the shaft 4 by a metal adaptor 26. The adaptor 26 extends from the upper face of the head 19 surrounded by a plurality of vanes 27 serving as a centrifugal blower for moving air radially outwardly from the head 19 during its rotation. As a result, the induced flow of air cools the motor 23 within the housing 12. The head 19 carries in its side peripheral surface 28 an aperture 31 through which the cutting line 21 extends radially outwardly.

The housing 12 includes a rearwardly extending tail part 32 which serves as a protection to the user to prevent inadvertent contact with the rotating cutting line 21. Also, the tail part provides an automatic limit to the extension of the cutting line 21 from the head 19. More particularly, the tail part 32 has a downwardly extending projection 33 in which is embedded a metal cutting blade 34. As a result, the cutting line 21 rotated by the head 19 can never have an operating length greater than the distance from the axis of rotation to the cutting blade 34, since any greater length will automatically be severed.

The head 19, as seen in FIG. 3, is disc-like with a smooth peripheral side surface which has the aperture 31 through which the cutting line 21 extends. Also, a metal curvilinear bearing surface 29 covers the leading and trailing edges of the aperture 31. The head 19 includes the hub 32 carrying the integrally formed vanes 27. The hub carries the adaptor 26 in which the drive shaft 24 is threaded. In addition, the adaptor 26 extends axially through the head 19 to form a convenient stud 33 for securing the various elements together. The interior of the hub 32 is formed into a cylindrical opening 34 in which is disposed a spool 36. The spool is mounted for both axial movement and independent rotation relative to the head 19. For this purpose, a cylindrical interior wall surface 37 of the spool is slidably journaled on a post portion 38 about the stud 33. Preferably, the post portion 38 is integral with the stud 33. A supply of the cutting line 21 is coiled upon the spool 36 in several layers. The interior end 35 of the coiled cutting line 21 is secured in a hole within the spool 36. The free end of the cutting line extends outwardly through the aperature 31 and across bearing surface 29.

The lower surface 41 of the head 19 is adapted to travel over vegetation and it preferably is smooth in contour, without substantial projections and recesses capable of trapping appreciable vegetation. Preferably, the surface 41 is convex and is coaxially aligned with the axis of rotation of the head 19. Stated in another manner, all parts of the surface 41 are unbroken in the line of travel during rotation of the head 19. However, this surface may be curved or multi-planar on a radial line extending across the head. In this manner, the surface 41 travels freely through the vegetation being cut and without appreciable loading of the electric motor 23.

As shown in FIG. 3, the surface 41 is formed upon an actuating member that projects from the head 19 and is mounted for manually induced movement from a first station to a second station when the surface 41 is pressed firmly against a surface (e.g. the ground). The actuating member may have various forms but preferable is shaped as a glide ball 42. The glide ball 42 is secured at a central recess 44 to the stud 33 by a shouldered screw 43. This mounting assembly allows the glide ball 43 to rotate about the head's axis of rotation and also to move axially along stud 33 between first and second stations. The spool 36 is confined between the hub 32 and the glide ball 42 and moves axially with it.

More particularly, the head 19 is assembled by first mounting a spring 46 about the stud 33 and within an annular recess 47 formed within the hub 32. Next, the spool 36 and glide ball 42 are secured by screw 43. The spring 46 will bais the spool and glide ball from the hub 32 into the first (outward) station in the head 19 as is shown in FIG. 3.

Elements are provided on the head 19 so that when the glide ball 42 is in the outward station, the spool 36 is held against rotation on the head 19. As a result, the cutting line 21 cannot be withdrawn from the spool 36, either manually or by centrifugal forces arising from rotation of the head 19. Various forms of locking structures may be employed for this purpose, such as an arrangement of toothed projections or recesses in the nature of an escapement and a preferred arrangement is shown by joint references to FIG. 3 and 5. For example, the post portion 38 carries uniformly spaces grooves 48, 49, 51 and 52. The spool's drum 53 carries inwardly presented teeth or pins 54, 56, 57 and 58. The pins are received in the grooves on the post portion 38. The grooves are longitudinal with the limited width to restrain the pins from angular movement when the spool and glide ball are in the outward station shown in FIG. 3.

Figure 4:
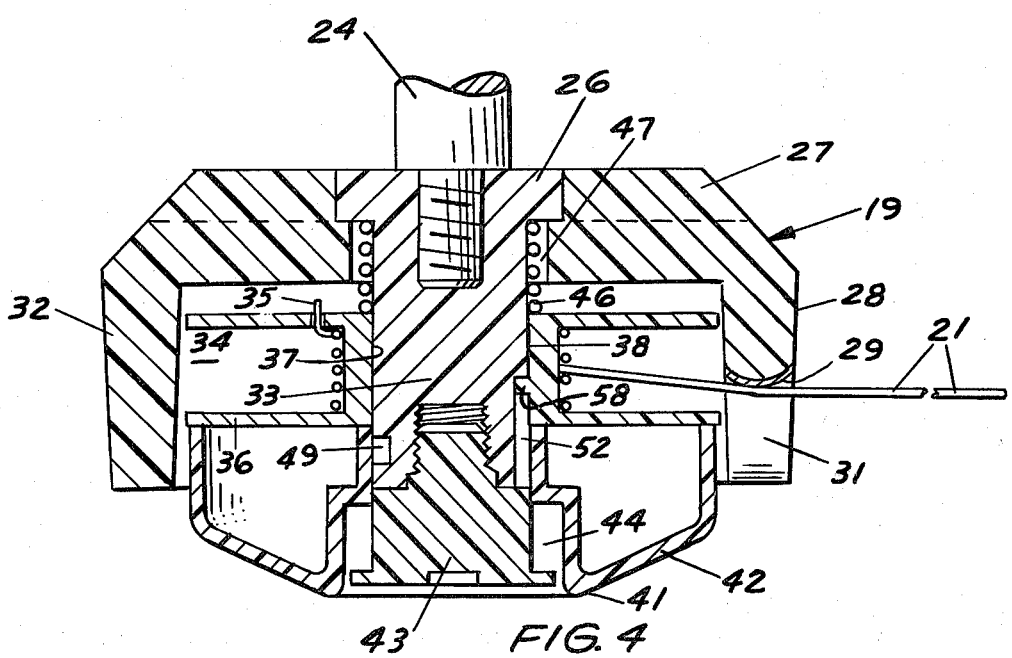
FIG. 4 is a vertical section like FIG. 3 but with the head shown during extension of cutting line.

The arrangement of the pins and grooves also provides a direct mechanical connection between the glide ball 42 and the spool 36. In particular, this connection translates (or transfers) the movement of the glide ball between the outward station (of FIG. 3) and the inward station (of FIG. 4) into rotation of the spool to extend a certain length of cutting line 21 from the head 19 into the cutting plane. As illustrated, when the grooves and pins are at 90 degree spacings, the spool 36 will be rotated one-fourth of a revolution for each movement of the glide ball 42 between the outward and inward stations.

Figure 7:
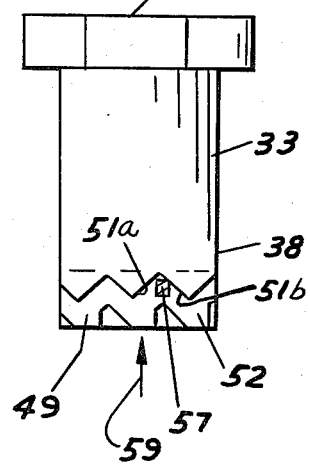
Figure 8:
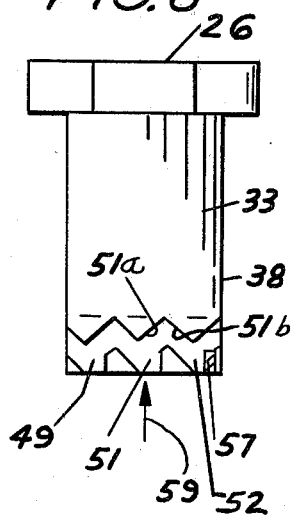

Each groove is a spiral ratchet and can have two sloped or inclined parts which cooperate to advance the pins the desired angular displacement in response to axial movement of the glide ball. For example in reference the adaptor 26 in FIGS. 6, 7 and 8, the groove 51 has inclined parts 51a and 51b to move the pin 57 from an index point (arrow 59) to the groove 52 so that the spool is rotated 90 degrees in the hub 32. As a result, a length of cutting line 21 is extended equal to one-fourth the circumference of one cutting line turns on the drum 53.

Although the groove 51 has inclined parts 51a and 51b that move the pin 57 upon both the inward and outward movement of the glide ball 42, other combinations of inclined parts of grooves can be used. Naturally, all the grooves should have the same symetrical configuration for best results.

Figure 5:
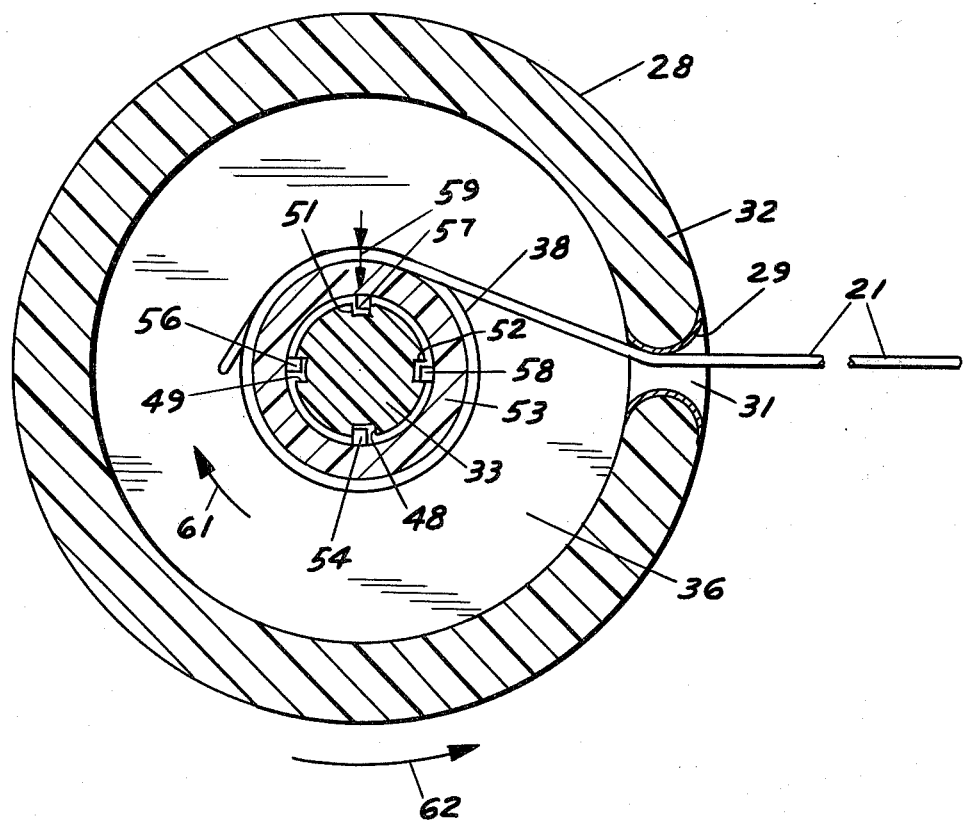
FIG. 5 is a horizontal cross-section of the head shown in FIG. 3 taken along line 5—5.
Figure 6:
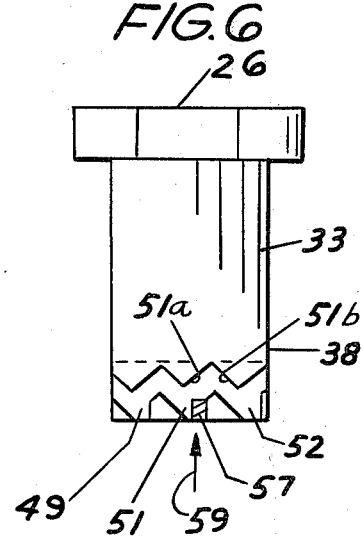
FIG. 6, 7 and 8 illustrate step-by-step functions of the spiral ratchet mechanical connections used in the present apparatus.

FIG. 6 shows the pin 57 with the head 19 in the position (as shown in FIG. 5) where the glide ball 42 is at the outward station. As the glide ball moves to the inward station (shown in FIG. 4) the pin 57 is guided along inclinded groove part 51a. when the spring 46 returns the glide ball to the outward station, the pin 57 is guided along inclined groove part 51b until it is locked within the groove 52 whereat the spool 36 is again held against the rotation relative to the head 19.

Since the grooves and pins cooperate to move the spool 36 in the direction of the arrow 61 in response to axial movement on the stud 33 of the glide ball 42, cutting line 21 will be extended from the head 19 irrespective whether it is stationary or rotating. The head 19 preferably rotates in the direction indicated by the arrow 62 and when being thusly rotated, the resultant movement greatly reduce the axial force needed to press the glide ball inwardly into the head. For this reason, rotatable mounting of the glide ball upon stud 33 produces a very light force needed to effect axial movement between stations and imposes little drag upon electric motor 23 if cutting line is extended while the head 19 is being driven or rotated.

The mechanism of the present apparatus for converting movement of the glide ball into direct controlled rotation of the spool 36 can be other than the spiral ratchet in construction and function. Preferably, the mechanism not only rotates the spool 36 by the operator pressing the glide ball 42 onto the earth's surface but also secures the spool against rotation in the head 19 when the glide ball is at its outward station shown in FIG. 4. No deleterious effects are placed upon the head 19 even if cutting line 21 is extended during operation of the motor 23. Usually, the head rotation with torque and friction effects causes the movement away from the earth's surface of the glide ball 42. As a result, the glide ball returns to the outward station and the extension of the cutting line 21 is completed very simply and automatically by the novel structure employed in the trimmer 11.

Although the head 19 may be formed solely or in any combination of metal, plastic or other material, it is preferred to use rather inexpensive polymeric materials which are readily fabricated by high speed molding operations. The spool 36 can carry sufficient cutting line 21 (e.g., 0.065–0.100 inch in diameter Nylon® polymer) for several years vegetation cutting before requiring a new supply of cutting line. When desired, the head is readily dissembled by removal of the spool 36 and glide ball 42. Then, a spool containing a fresh supply of the cutting line 21 can be installed in the head 19. Alternatively, the removed spool 36 can be rewound with a fresh supply of cutting line and reinstalled within the head 19.

From the foregoing description, it will be apparent that there has been provided a novel apparatus for cutting vegetation which provides a convenient and safe method of extending cutting line as desired by the operator. It will be understood that certain changes or alterations in the present apparatus may be made without departing from the spirit of this invention. These changes are contemplated by and are within the scope of the appended claims which define the invention. Additionally, the present description is intended to be taken as an illustration of this invention.

What is claimed is:
1. An apparatus for cutting vegetation, comprising:
   (a) a head rotatable about an axis of rotation with a drive connection extending from a first face and a second face adapted to travel over vegetation-covered earth's surface;
   (b) a spool in said head and having an interior cylindrical wall about an axial opening therethrough;
   (c) a flexible non-metallic cutting line coiled on said spool and having a free end extending outwardly from said head through aperture means into a cutting plane;
   (d) a glide ball actuator on said second face and connected with said spool for manually-induced axial movement from a first station to a second station when said second face is pressed firmly against a surface to move said glide ball actuator;
   (e) a post with an exterior cylindrical sidewall mounted coaxially with the rotational axis within said head, and said spool mounted on said post with said cylindrical sidewalls thereon providing bearing means for rotation of said spool relative to said head and for axial movement of said spool along said post;
   (f) bias means on said head for urging said glide ball actuator and spool in unison from the second position to said first position;
   (g) said post on its cylindrical sidewall having formed an encircling groove having at spaced angular intervals at least two inclined parts and an indexing point;
   (h) said spool carrying at its cylindrical sidewall at least one inwardly-projecting pin and each said pin received within said encircling groove on said post; and
   (i) said encircling groove guiding said pin therein from said indexing point along one of said inclined parts, and then, along the other of said inclined parts to the next of said indexing points as said glide ball actuator and said spool are moved from the first position to the second position and then returned to the first position whereby the travel of said pin in said inclined parts of said encircling groove by direct mechanical connection rotates said spool relative to said head by a certain angular displacement between uniformly angular positions whereat said spool is secured to said head at each said indexing point and thereby extending a length of cutting line from said head into the cutting plane.

2. The apparatus of claim 1 wherein said encircling groove has four of said indexing points at 90-degree uniform spacings on said post whereby said spool is rotated one-fourth a revolution relative to said head by movement of said glide ball actuator between the first and second positions.

3. The apparatus of claim 2 wherein said encircling groove is formed with an even number of said indexing points separated by a pair of said inclined parts, and said spool carries the same even number of inwardly-projecting pins received within said groove.

4. The apparatus of claim 1 wherein said encircling groove is formed with a plurality of indexing points separated by a pair of said inclined parts, and said indexing points are disposed at a uniform angular spacing about said cylindrical sidewall of said post.

5. The apparatus of claim 4 wherein said spool carries a like plurality of projecting pins as of said indexing points, and said pins are disposed on said spool at a uniform angular spacing about the axial opening therethrough.

6. An apparatus for cutting vegetation, comprising:
   (a) a head rotatable about an axis of rotation with a drive connection extending from a first face and a second face adapted to travel over vegetation-covered earth's surface;
   (b) a spool in said head and having an interior cylindrical wall about an axial opening therethrough;
   (c) a flexible non-metallic cutting line coiled on said spool and having a free end extending outwardly from said head through aperture means into a cutting plane;
   (d) a glide ball actuator on said second face and connected with said spool for manually-induced axial movement from a first station to a second station when said second face is pressed firmly against a surface to move said glide ball actuator;
   (e) a post mounted within said head, and said spool mounted on said post by bearing means providing for rotation of said spool relative to said head and for axial movement of said spool along said post;

(f) a spring carried in said head for urging said spool and said glide ball actuator from the second position to the first position;

(g) said post in its sidewall having an encircling groove containing inclined parts and a longitudinal part forming an indexing point;

(h) said spool carrying at least one radially inwardly-projecting pin, and each pin is received within said encircling groove on said post;

(i) said longitudinal part of said encircling groove receiving said pin to secure said spool against rotation relative to said head when said glide ball actuator and said spool are in the first position;

(j) said inclined parts of said encircling groove providing a direct connection by guiding each said pin to rotate through a certain angular displacement of said spool relative to said head as said glide ball actuator and spool are moved axially between the first and second positions, whereat a length of cutting line is extended from said head into the cutting plane.

7. The apparatus of claim 6 wherein said encircling groove is arranged with four equally-spaced inclined and longitudinal parts whereby said spool is rotated one-fourth of a revolution relative to said head by movement of said glide ball actuator between the first and second positions.

8. The apparatus of claim 6 wherein said encircling groove has a pair of inclined parts between each longitudinal part.

9. The apparatus of claim 8 wherein said inclined parts of equal angular and axial displacements.

* * * * *